United States Patent [19]

Schwerin

[11] 4,176,688
[45] Dec. 4, 1979

[54] CHECK VALVE

[75] Inventor: Günther Schwerin, Möglingen, Fed. Rep. of Germany

[73] Assignee: Robert Bosch GmbH, Stuttgart, Fed. Rep. of Germany

[21] Appl. No.: 871,109

[22] Filed: Jan. 20, 1978

[30] Foreign Application Priority Data

Feb. 9, 1977 [DE] Fed. Rep. of Germany ....... 2705303

[51] Int. Cl.$^2$ ............................................. F16K 31/385
[52] U.S. Cl. ........................... 137/630.13; 137/630.15; 251/38
[58] Field of Search ....................... 137/630.13, 630.15; 251/38

[56] References Cited

U.S. PATENT DOCUMENTS

| 3,213,887 | 10/1965 | Angelery | 137/630.15 |
| 3,447,568 | 6/1969 | Burkart et al. | 137/630.13 |
| 3,667,722 | 6/1972 | Katz et al. | 251/38 X |
| 3,906,991 | 9/1975 | Haussler | 251/38 X |

Primary Examiner—Arnold Rosenthal
Attorney, Agent, or Firm—Michael J. Striker

[57] ABSTRACT

A check valve with pilot actuation for hydraulic systems has a valve housing with a main bore and main seat, a main valve member movable in the main bore between a closed position and an open position and having an additional inner bore with a conical mouth at one end thereof, a pilot valve member movable between a closed position and an open position in said additional bore, and a push rod operative for moving the pilot valve member to the open position thereof. The push rod has a first thinner portion and the second thicker portion forming a shoulder. A conical transitional portion is formed between the above two portions and is complementary to the conical mouth of the bore of the main valve member. The push rod has pressure-relief clearances formed in the region of the transitional portion and the shoulder, and so located that when the transitional conical portion is seated on the conical mouth fluid in said additional bore can pass through the clearances.

12 Claims, 4 Drawing Figures

CHECK VALVE

BACKGROUND OF THE INVENTION

The present invention relates to a check valve with pilot actuation for hydraulic systems.

Check valves having a pilot valve have been known in the art. In the known check valves the force required for opening a valve member of the pilot valve is relatively great. Reduction of the diameter of the seat for the valve member formed in the pilot valve has certain limits. The reason for this is that the diameter of a push rod moving the valve member from its seat because of the force acting thereon cannot fall below a certain dimension, since the push rod is relatively long and cylindrical. Furthermore, in the known check valves pressure-relief formations are provided in a main valve member so that the seat is located relatively far from the end face of the main valve member facing toward the push rod. Because of this, reduction of the length of the cylindrical portion is not possible. It is especially true since the reduction of the diameter of the cylindrical portion reduces resistance against bending with the third power and resistance against deflecting with the fourth power.

SUMMARY OF THE INVENTION

Accordingly, it is an object of the present invention to provide a check valve which avoids the disadvantages of the prior art.

More particularly, it is an object of the present invention to provide a check valve in which in order to attain a small opening force the dimensions of a pilot valve can be reduced, and a first portion of a push rod is, nevertheless, so formed that it withstands the stresses occurring in practice especially with respect to pressure, bending and flexing. The short structure of the first portion of the push rod is favorable because a first seat in a main valve member is located near to an end face thereof.

In keeping with these objects, and with others which will become apparent hereinafter, one feature of the present invention resides, briefly stated, in a check valve having a main valve member movable in a main bore between an open position and a closed position, a pilot valve member movable in an additional bore of the main valve member having a conical mouth between a closed position in which it is seated in a seat formed in the main valve member and an open position, and a push rod operative for moving the pilot valve member to the open position and having two portions of different diameter forming a shoulder, a conical transitional portion between these two portions and complementary to the conical mouth, and pressure-relief clearances in the region of the transitional portion and the shoulder. The above elements of the push rod are so located that when the transitional conical portion of the push rod is seated on the conical mouth of the main valve member fluid in the bore of the latter can pass through the pressure-relief clearances.

Another feature of the present invention is that a length of a first one of the above two portions of the push rod may be at most equal to the diamter of the pilot valve member.

Still another feature of the present invention is that a distance between the seat of the pilot valve member and an end face of the main valve member facing towards the push rod may be at most equal to the diameter of the pilot valve member.

A further feature of the present invention is that the transitional conical portion of the push rod and the conical mouth of the main valve member together form at least one through-going passage, when the shoulder of the push rod is seated on the end face of the main valve member.

The pilot valve member may be urged toward the seat thereof by a spring. It may also have a second seat spaced from the first-mentioned seat so that the pilot valve member can move to a further closed position to be seated on the second seat. A stroke of the pilot valve member between the above two seats may be greater than the first portion of the push rod.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

Figure 1:
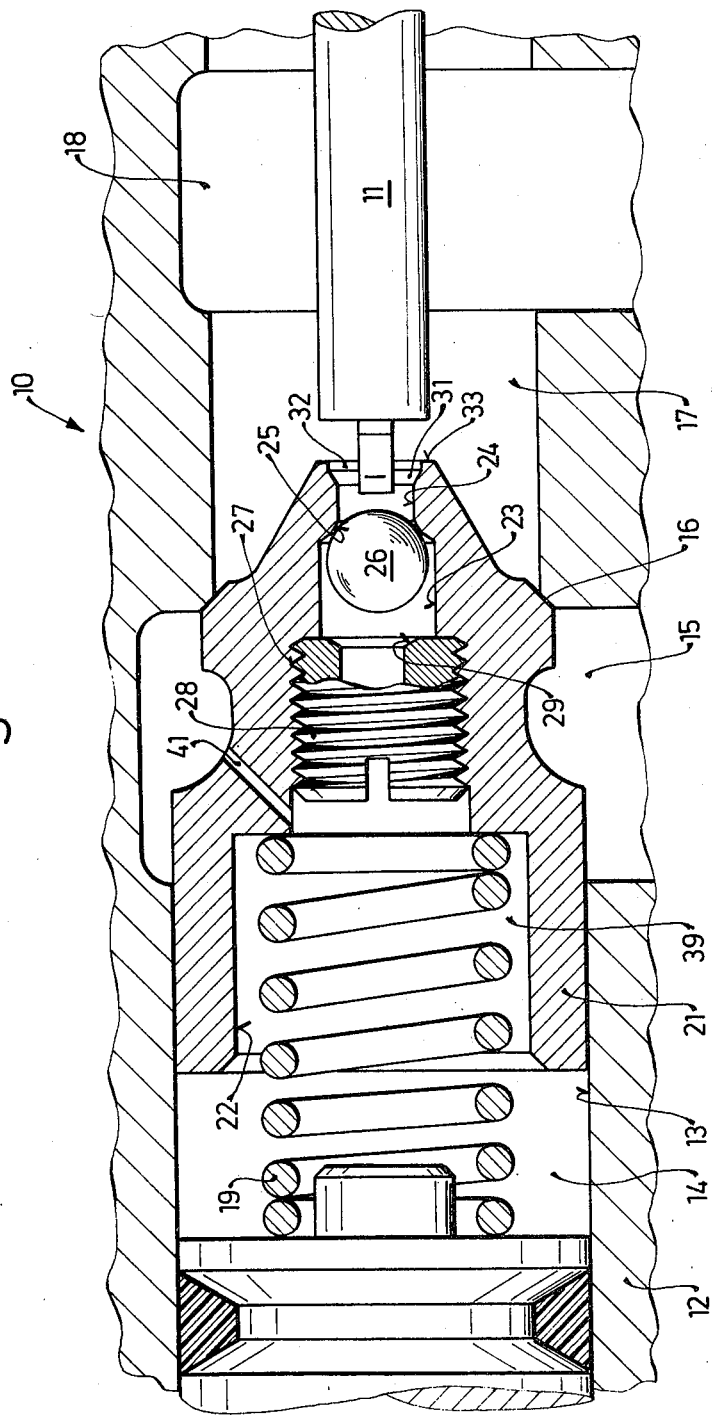
FIG. 1 is a view showing a longitudinal section of a check valve in accordance with the present invvention.

FIG. 1 shows a check valve with pilot actuation by a push rod 11. The valve has a housing 12 and a longitudinal bore 13 of a stepped cross-section provided in the housing. The bore 13 has a first section 14 piercing a consumer chamber 15 and further passing past a valve seat 16 into a second section 17. The second section 17 of the bore 13 has a smaller diameter than the first section 14 and communicates with a supply chamber 18. A main valve member 21 is slidably movable in the first section 14 of the bore 13 and is urged toward the seat 16 by a spring 19. The main valve member has an inner bore 22 of a stepped cross-section. The bore 22 has two sections 23 and 24 forming a first seat 25 for a ball-shaped valve member 26. The latter is movable with play in the section 23 of the bore 22.

A threaded sleeve 28 is threaded into a threaded portion 27 of the section 23 of the bore 22. The threaded sleeve 28 forms a second seat 29 facing toward the valve member 26. The bore 22 has a conical widening mouth 31 and a short cylindrical section 32 formed near an end face 33 of the main valve member which faces toward the push rod 11.

Figure 2:
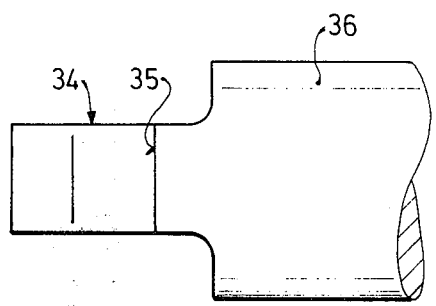
FIG. 2 is an enlarged view showing a portion of a push rod of the check valve in accordance with the invention.
Figure 3:
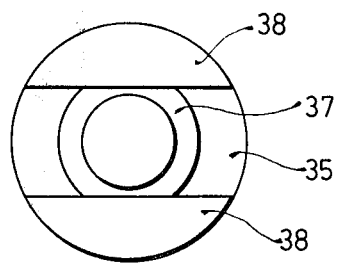
FIG. 3 is a side view of the push rod shown in FIG. 2.
Figure 4:
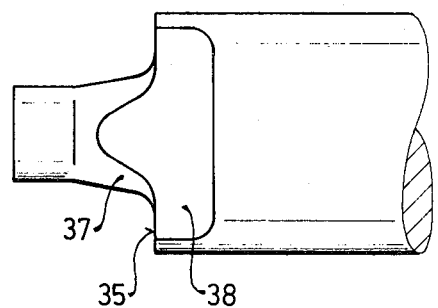
FIG. 4 is a plan view of the push rod shown in FIG. 2.

As shown in FIGS. 2 through 4, the push rod 11 has a first portion 34 of a relatively small diameter which forms with a second portion 36 having a diameter exceeding the diameter of the first portion 34, a shoulder 35. Intermediate the second portion 36 and the first portion 34 a transitional portion 37 is provided serving for increasing the rigidity. The transitional portion 37 is complementary to the widening mouth 31 of the valve member 21. Simultaneously, pressure-relief clearances 38 are formed in the region of the transitional portion 37 and on the shoulder 35 at opposite sides thereof. A length of the first section 34 is as small as possible, and is preferably smaller than the diameter of the valve member 26. The transitional portion 37 is formed with respect to the widening mouth 31 so that the portion 35 can strike against the end face 33 of the main valve member 21. In this position the valve member 26 must be withdrawn from its first seat 25 so far that an intermediate pressure can be built in a recess 39 receiving the spring 19 so as to make possible a pilot control. Moreover, in this position the transitional portion 37 leaves free a portion of a cross-section in the widening mouth 31 for flowing of a pressure medium therethrough. The latter passes past the pressure-relief clearances into the supply chamber 18. A throttle 41 is further provided in the main valve member 21 and communicates the recess 39 with the consumer chamber 15. The length of the first portion 34 of the push rod is dimensioned so that when the portion 35 abut against the end face 33 the locking member 26 is located at a certain distance from the second seat 29.

The check valve in accordance with the present invention operates as follows:

When a pressure medium flows from the supply chamber 18 to the consumer chamber 15, the valve member 26 abuts first on its second seat 29, so that the main valve member 21 is withdrawn from the valve seat 16 and direct communication between the both chambers are established.

When the consumer chamber 15 is under a load pressure and the pressure medium must flow back into the supply chamber, the push rod 11 is moved to the left against the main valve member 21. In this case the push rod 11 opens by its first portion 34 a pilot valve formed by the elements 25 and 26. It strikes by its portion 35 onto the end portion 33 only in the case, when the load pressure is too weak for for the following operations to take place. The pressure existing in the recess 39 reduces as the pressure medium flows past the second seat 29, the pilot valve 25, 26, the second portion 24 of the bore 22 and, when the portion 35 abuts against the end face 33, past the relief clearances 38. Therefore, the pressure acting from outside upon the main valve member 21 in the consumer chamber 15 urges the valve member 21 from the valve seat 16 against the force of the spring 19 and the force generated by the intermediate pressure in the recess 39, and thereby communication with the supply chamber 18 is established.

Thus, the main valve member 21 follows the movement of the push rod. When the push rod 11 stops, the valve member 21, while continuing to move relative to the push rod 11, reduces the flow cross-section between the valve member 26 and the first seat 25. Thereby the pressure in the recess 39 is again increased through the bottle 41 until the force equilibrium is attained and the valve member 21 becoomes immovable. Thus, the position of the locking member 21 is determined by the position of the push rod 11. This operation which is known as a pilot control is performed in a corresponding reverse order in the case when the main valve member 21 performs locking movement. Since the first seat has a small diameter such as 3 mm. it is guaranteed that the force to be applied is relatively small and the first portion 34 on the push rod 11 continues to function even under the action of the force generated by high pressure equal to 300 bar, and thereby the danger of bending is eliminated.

The pilot valve member may have the diameter smaller than 5 mm, and preferably equal to 3.5. The first portion of the push rod may have the diameter smaller than 2 mm., and preferably equal to 1.6 mm.

It will be understood that each of the elements described above, or two or more together, may also find a useful application in other types of constructions differing from the types described above.

While the invention has been illustrated and described as embodied in a check valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A check valve with pilot actuation, for hydraulic systems, comprising a valve housing having a main bore communicating with a consumer chamber and a main seat formed in said main bore; a main valve member movable in said main bore between a closed position seated on said main seat and an open position and having an additional inner bore provided with an additional seat, said main valve member having two spaced ends and said additional bore having a conical mouth at one of said ends, said main valve member being loaded from said consumer chamber to said closed position; a pilot valve member movable in said additional bore between a closed position seated on said additional seat and an open position, said pilot valve member being loaded from said consumer chamber to said closed position; and a push rod operative for moving said pilot valve member to said open position, said push rod having a first portion facing toward said pilot valve member and a second portion having a diameter exceeding the diameter of said first portion, said first portion and said second portion forming a shoulder, said push rod having intermediate said first and second portions a conical transitional portion complementary to said conical mouth, said push rod furthermore having pressure-relief clearances in the region of said transitional portion and shoulder so located that when said transitional conical portion is seated on said conical mouth fluid in said additional bore can pass through said clearances.

2. The check valve as defined in claim 1, wherein said pilot valve member is ball-shaped.

3. The check valve as defined in claim 2, wherein a length of said first portion of said push rod is at most equal to the diameter of said pilot valve member.

4. The check valve as defined in claim 2, wherein said main valve member has an end face facing toward said push rod, a distance between said additional seat for said pilot valve and said end face of said main valve member being at most equal to the diameter of said pilot valve member.

5. The check valve as defined in claim 1, wherein when said shoulder of said push rod is seated on said end face of said main valve member, said transitional conical portion of said push rod together with said conical mouth of said additional bore of said main valve member forming at least one through-going passage.

6. The check valve as defined in claim 2, wherein said pilot valve member has the diameter smaller than 5 mm.

7. The check valve as defined in claim 6, wherein said pilot valve member has the diameter equal to 3.5 mm.

8. The check valve as defined in claim 1, wherein a diameter of said first portion of said push rod is smaller than 2 mm.

9. The check valve as defined in claim 8, wherein a diameter of said first portion of said push rod is equal to 1.6 mm.

10. The check valve as defined in claim 1; and further comprising a second additional seat spaced from said first-mentioned additional seat so that said pilot valve member can be moved by said push rod to a further closed position in which it is seated on said second additional seat.

11. The check valve as defined in claim 10, wherein said second additional seat is formed in said main valve member.

12. The check valve as defined in claim 10, wherein said shoulder of said push rod can be seated on said end face of said main valve member, said additional seats being spaced from one another so that a stroke of said pilot valve member between said additional seats and thereby between said closed positions is greater than the distance between said pilot valve member and said first-mentioned additional seat when said shoulder of said push rod is seated on said end face of said main valve member.

* * * * *